United States Patent [19]

Livingston

[11] 4,188,418

[45] Feb. 12, 1980

[54] SEPARATION PROCESS

[75] Inventor: Robert M. Livingston, Welwyn, England

[73] Assignee: Lever Brothers Company, New York, N.Y.

[21] Appl. No.: 879,657

[22] Filed: Feb. 21, 1978

Related U.S. Application Data

[63] Continuation of Ser. No. 773,037, Feb. 28, 1977, abandoned, which is a continuation of Ser. No. 708,797, Jul. 26, 1976, abandoned, which is a continuation of Ser. No. 385,014, Aug. 2, 1973, abandoned.

[51] Int. Cl.$^2$ ............................................... B05D 5/00
[52] U.S. Cl. ..................................... 427/245; 264/41; 210/500 M
[58] Field of Search ............... 210/234, 490, 500 M, 210/502; 264/41, 45, 59; 106/194, 196; 427/245, 246

[56] References Cited

U.S. PATENT DOCUMENTS

| | | | |
|---|---|---|---|
| 2,574,533 | 11/1951 | Cornwell et al. | 210/23 X |
| 3,555,129 | 1/1971 | Fukada et al. | 264/41 |

*Primary Examiner*—Charles N. Hart
*Assistant Examiner*—Ferris H. Lander
*Attorney, Agent, or Firm*—Kurtz, Melvin H.

[57] ABSTRACT

The flux rate of ultrafiltration membranes is markedly improved by the presence of inert, water-insoluble, impervious particles, particularly of metals and their alloys, distributed wholly within the membrane. The particles are particularly effective in the region adjacent the interface of the membrane with a support surface and may be distributed previously in the casting dope, or applied in a thin coating to the surface on which the membrane is subsequently prepared by casting from the dope. The membrane is in flat, tubular or filamentary form.

2 Claims, No Drawings

SEPARATION PROCESS

This application is a continuation of application Ser. No. 773,037, filed Feb. 28, 1977, now abandoned, which in turn is a continuation of application Ser. No. 708,797, filed July 26, 1976, now abandoned, which in turn is a continuation of application Ser. No. 385,014, filed Aug. 2, 1973, now abandoned.

BACKGROUND OF THE INVENTION

1. Field of the Invention

The invention is concerned with improved ultra-filtration membranes in which the flux rate is improved by the presence of a finely-divided, inert, water-insoluble and impervious particulate matter wholly incorporated in the membrane, particularly in the region adjacent the interface of the membrane with its support surface. The membranes are suitable for concentrating solutions and dispersions of comparatively large molecules, for example protein in whey and milk.

2. The Prior Art

Membrane filtration is now well established as a means for effecting the separation of components in a liquid mixture, usually in an aqueous vehicle, which differ in their effective molecular sizes. The membranes are in the form of a thin, coherent film made from polymeric material, usually man-made and either of synthetic polymers or of a modified cellulose base. The membranes are classified according to the molecular dimensions of the pores through which permeation takes place. These dimensions in turn determine the pressure which must be applied to the solutions undergoing filtration. Membranes with small pores may permit the passage of water but not of salt ions. Substantial pressures, of several hundred pounds per sq. inch, may then be necessary to effect the separation of water from the solution by means of such membranes, to counter the considerable osmotic pressure which is generated in consequence, across the membrane before water can permeate through it. In these reverse osmosis processes, the hyperfiltration membranes are commonly made by casting a film from a dope of the polymer dissolved in a volatile membrane and allowing the solvent to evaporate. The membrane is then almost invariably cured by heating.

Reverse osmosis processes are widely used for obtaining potable water from brackish water and especially from sea water, and for concentrating inorganic sewage. Hyperfiltration membranes have also been used to effect a concentration of aqueous materials, for example fruit juices, whey, milk and other aqueous protein sources, but the flux rates through these membranes are unduly low and the pressures at which they must be used excessively high. Early attempts have been made to enlarge the pore size of these membranes by including within the casting dope a proportion of pore-enlarging material. An early description of hyperfiltration membranes is given by Loeb et al U.S. Pat. No. 3,133,132 and 3,133,137, the membrane being cast as already described, from a dope comprising a volatile solvent in which the polymer is dissolved, together with pore-enlarging perchlorate salt. The effect of these additives in hyperfiltration membranes has however been shown to be unsatisfactory, leading to tenderisation of the membrane material and tending to form flaws in the membrane.

More recently, membranes have been developed which are permeable to salt solutions but reject larger molecules that themselves generate negligible osmotic pressure. Such membranes may therefore be used to concentrate larger molecules and being permeable to salts in addition to water, operate at substantially lower pressures than hyperfiltration membranes. These ultrafiltration membranes are prepared similarly from a casting dope of the polymer, dissolved however in a non-volatile solvent, for example dimethyl formamide and dimethyl sulphoxide. A description of ultrafiltration membranes and their properties appears in the Saline Water Conversion Report, 1968, page 191 and in German published Pat. No. 2,207,656. The present invention is concerned with improving the flux rate of the ultrafiltration membranes still further.

This invention relates to membrane filtration processes and to improved semi-permeable membranes for use in such processes.

Semi-permeable membranes used in membrane filtration processes enable the separation to be effected of material down to molecular dimensions, usually from aqueous systems. According to the selectivity of the membranes, otherwise expressed as the rejection characteristics, they find widespread application for example in desalinating brine, purifying effluent and concentrating milk protein, particularly in whey.

In hyperfiltration processes in which small solute molecules of molecular weight less than about 100 can be separated, membranes of fine pore size are employed in conjunction with filtration pressures of 1,000 psi or more which are necessary to overcome th considerable osmotic pressure generated by the small molecules. The selective rejection of much larger molecules, eg proteins, of molecular weight generally over 1,000, is effected on the other hand by membranes of more open pore structure, in ultrafiltration processes in which osmotic pressure is negligible and in which therefore substantially lower filtration pressures are adequate, generally about 100 psi or even less.

The present invention provides a semi-permeable, ultrafiltration membrane, suitable for use in ultrafiltration processes, in which a minor amount of an inert, impervious, water-insoluble, preferably inorganic, solid material in the form of finely-divided non-colloidal particles is dispersed wholly within the membranes so as to swell or otherwise change the structure of the membrane, thereby increasing its flux rate.

It has been found that the membranes of the invention can exhibit up to 2-3 times the flux, at a given pressure and temperature of otherwise identical membranes without the added particles. On the other hand, the rejection characteristics of the membranes towards protein and other large organic molecules which can normally be separated by ultrafiltration remain substantially unaffected. The flux rate is the flow rate that can be treated by unit area of membrane, and is commonly expressed in gallons per 24 hours per ft$^2$, either US or Imperial gallons.

The exact mechanism by which the inorganic material improves the membranes is not known. The filtration of proteins in milk or other aqueous systems is adversely affected by the build-up of proteins on the surface of the membrane, forming a second "filter" having a poor flux rate. Without wishing to diminish the scope of the invention described by any expression as to its mechanism, it is believed that filtration through the membranes of this invention is improved by charged groups carried by the particles, effective amounts of which thus repel milk proteins from the membrane surface. This leads to higher permeation rates of water and dissolved salts through the membane, by lining the surface of passages through the membrane skin to give these areas a negative charge and thereby allowing effusion of neutrally-charged molecules through the membrane while rejecting charged molecules such as protein. it should be emphasised that the membranes of the present invention being of open pore structure, exercise no selective filtration action on aqueous solutions of small solutes, eg brine solutions, capable of exerting a strong osmotic pressure and are thus distinguished from reverse osmosis membranes which do so. Their application in ultrafiltration processes lies in their selective rejection of comparatively large molecules, for example, proteins. The limits of their effectiveness for this purpose, that is, the minimum size of molecules which they are capable of rejecting, depends largely upon the effective pore size of the membrane and hence upon the conditions and materials of its preparation but also upon the conditions under which it is used, particularly the operating pressure, increased pressure often effectively decreasing pore size. This is particularly observed where, as in milk and whey concentration using ultrafiltration methods, a wide spectrum of solute molecular sizes is present, providing a build-up of the bigger rejected solute molecules on the membrane in a layer which itself exercises a filtration action in the smaller molecules to which the membrane itself is non-rejecting. Thus, lactose solutions may be found to be filtered unchanged through a membrane which will however at least partially reject the lactose in milk or whey in the presence of the protein molecules, and the degree of rejection may then be enhanced with increased pressure above that customarily adopted for ultrafiltration.

Semi-permeable membranes are generally cast from a solution, usually referred to as dope, of a film-forming polymer in an organic solvent, the membranes used in hyperfiltration processes being cast from volatile solvent, for example acetone. The ultrafiltration membranes of the present invention, however, are conveniently prepared from dope comprising non-volatile organic solvents having a boiling point substantially in excess of 100° C. Suitable solvents include dimethyl formamide, dimethyl sulphoxide and triethyl phosphate. It is surprising that membranes cast from volatile solvents show no improvement when particles are incorporated but on the contrary often exhibit flaws and are then wholly unsuitable for use. An important feature of the present invention is in the preparation of cellulose acetate ultrafiltration membranes, particularly from solutions in dimethyl formamide. These membranes can be used at elevated temperatures up to approximately 80° C., enabling ultrafiltraton processes to be carried out at temperatures at which, for example, milk or whey may be pasteurised.

The concentration of polymer in the dope is not critical. Solutions from about 5% to 50% and above may be used if desired, up to the limits of solubility of the polymer. Preferably, however, a solution of 10–30% by weight concentration is used. Very dilute solutions tend to form very fragile membranes, while those prepared from very concentrated solutions may be tough but are often slow in use.

The invention also provides a method of preparing improved ultrafiltration membranes in which a solution of film-forming polymeric material, for example a cellulose ether or ester, is dissolved in a non-volatile solvent and as inert, finely-divided inorganic water-insoluble material is added having a mean specific surface area of preferably at least 50 $m^2/g$, and distributed throughout the solution, a film is cast and the solvent is leached by contact with a miscible solvent in which the polymer is insoluble.

The particles should be small compared to the molecular size of the membrane material. Bigger particles exceeding the cellular dimensions tend to form gaps in the membrane. Only a comparatively small concentration is needed to provide effective cover for all the membrane interfaces with the liquid to be filtered. The particles should preferably constitute at least 1% of the membrane casting solution, preferably 1–4% for carbon particles and from 4–25% is particularly preferred for metal particles. These amounts are expressed in the specification by weight, as grammes per cc of solution, 1% therefore representing 1 gramme as additive per 100 cc of solution. Greater amounts, up to 50%, may enhance the membrane flux still further, bur some loss may then occur of selectivity, to give a lower rejection factor towards molecules of specified size. The concentration at which this occurs is dependent upon the nature of the casting dope, including the size and nature of the active material. With these greater quantities the membranes may then become selective only towards th bigger molecules such as bacteria, while passing even milk protein, or defects in the membrane may develop. However, as much as 50% may be acceptable of some material, eg metal particles, without loss of milk protein rejection. In general also a greater change is effected using dimethyl sulphoxide than dimethyl formamide as the casting solution.

Suitable material to be added to the membrane is the form of particles in accordance with the invention include lamp black, carbon black and soot. Other inorganic materials which may be used include iron, and ferrous alloys including steel, metals generally if these are stable, both elements and their alloys, particularly nickel, cobalt, aluminum and their oxides, silica, silicon, sulphur and alumina. The materials should be substantially insoluble in water and the casting solvent, and exert no hydrolytic, catalytic, oxidative, reductive or other chemical change likely to lead to deterioration of the casting solvent or membrane material. They should be impermeable and should not penetrate the membrane when this is formed. The particles should not form suspensions in water.

A wide range of particle sizes may be adopted, but the best size range may vary from one material to another. Thus, for carbon particles a range of 10–30 millimicrons is preferred, whereas for silica and metal particles the individual particle size should preferably be within the range 1–5 micron. Particles of metals, for example stainless steel, exhibit a tendency to aggregation and may be used in aggregation form, up to 200 microns in size, or even more, and selected ranges of aggregates may show improved behaviour compared with the rest, according to the nature of the dope solvent and the concentration of the added particles. While the coarser fractions of aggregated metal particles may exercise a greater effect, they may alternatively lead to membrane defect.

The particles themselves exhibit no permeability and when slurried in water they should give a pH of 3–7.

The membranes of the invention may be prepared from a variety of polymers. These are preferably cellulose-based, preferably lower esters or ethers, eg acetate, propionate and butyrate, or methyl, ethyl or propyl cellulose. Other polymers which may be used to prepare the membrane include poly-ion polymers, prepared by reaction of poly-anions with poly-cations, polyvinyl chloride, polyacrylonitrile, poly-olefins and polyacrylic esters, particularly of lower alcohols. Apart from the addition of the inorganic particles, the membranes of the invention may be prepared by methods which are conventional for the preparation of ultrafiltration membranes. Thus, the casting solution after the addition and distribution therein of the inorganic particles, is cast as film in flat, tubular or other convenient form, for example as fibres, preferably at room temperature, but if desired at other temperatures, and is preferably contacted less than a minute afterwards, in a leaching bath, for example water, where the solvent diffuses out through the membrane into the leaching bath while the water from the bath passes through the membrane.

The membrane may also be cast directly onto a porous backing providing adequate mechanical support for the membrane. In any case, preferably the membrane when completed is between 5 and 25 mils in thickness, ie 0.012–0.0625 cms, but membrane thicknesses up to 1 mm or even more may be suitable. Thicker membranes are more robust, but show a corresponding decrease in flux rate. As in conventional procedure in the preparation of semi-permeable membranes, the thickness of the membrane may be controlled by the method of applying the dope to the support on which the film is prepared, and its concentration.

In contrast to membrane cast from volatile solvents, which form an active layer at the air interface that performs the selective filtration function and must be exposed to the solution side of the filtration system for best effect, membranes cast from non-volatile solvents form a corresponding skin serving the same purpose at the interface with the surface on which the film is cast, and this must be exposed with the skin on the filtrate side, remote from the solution undergoing filtration, to exhibit a high flux while being selective to larger molecules in an ultrafiltration capacity. In the preparation of a membrane according to the invention it is found that the greatest flux improvement effected by a given quantity of additive particles occurs when they settle in the membrane casting, concentrating near the interface with the support material in the active layer and thus providing an anisotropic, ie asymmetric distribution. To this end, aggregated particles are preferred which settle rapidly in the dope. Sufficient time should be permitted for this to occur, but the membrane should in any event be leached to remove solvent, within five minutes of completing the casting. An asymmetric distribution may however be encouraged in internal membranes supported on tubes, by rotating these to apply centrifugal force to the particles in the casting. In use, the prepared membrane is mounted in a suitable test cell or similar arrangement providing adequate mechanical support for the membrane and the milk or other liquid system to be filtered is supplied under pressure to the contact surface of the membrane. The liquid is usually circulated continuously until the degree of concentration required is obtained.

In the following Examples a series of membranes was prepared using a variety of particulate additive materials, all of which exhibited a specific surface area of at least $30^2$ m/gm and a pH of about 5. This was measured by immersing an electrode of a pH meter in the supernatant liquor obtained by slurrying about 5% of the material under test in water.

The stainless steel particles used were of 316L stainless steel, containing 14% nickel, 17% chromium and 2.5% molybdenum. They were nominally 5 microns diameter but aggregated. In Examples 5 and 6 the particles were sieve-graded and the fractions obtained were used in separate tests to demonstrate the effect of the extent of aggregation between the particles upon the flux rate. About three-quarters of the aggregate was of mesh sieve size 60–90 microns.

In each case the same grade of secondary cellulose acetate was used to prepare the membrane, which was cast at about 15° C.

EXAMPLE 1

A semi-permeable membrane was prepared from a casting solution having the following composition:
20 gms cellulose acetate
100 mls dimethyl formamide
4 gms carbon black, particle size 14 millimicrons, pH 5.0.

The carbon was added to a solution of the cellulose acetate in the dimethyl formamide, giving a viscous liquid which was cast into a membrane by spreading the solution with a doctor blade onto a plate of optical glass permitting a blade opening 0.2 cms. After 1 minute, the plate was immersed in water to provide a membrane 0.018 cms in thickness.

A similar membrane, prepared without the introduction of carbon black particles was also prepared. The two membranes were then compared by filtering skim milk having a pH of 6.8, at a working pressure of 200 psig at 50° C. The results of the comparison are set out in Table 1, from which it will be apparent that a marked improvement in flux rate and selectivity results from the presence of carbon black in the membrane.

TABLE I

| Temp. °C. | Example | | Control | |
| --- | --- | --- | --- | --- |
| | 15 | 50 | 15 | 50 |
| Flux rate usgfd* | 10.5 | 13.5 | 4.9 | 5.8 |
| Lactose in permeate wt % | 2.5 | 1.9 | 3.7 | 3.3 |

*US gallons per ft$^2$ of membrane per 24-hour day.

From this data the rejection characteristics of the membrane according to the invention, with respect to lactose, was calculated as 10%, while that for the control was 8½%.

EXAMPLE 2

Membranes were prepared as described in Example 1, except that instead of carbon black, particles of micronised stainless steel were used having a particle size range of 1–5 microns. The thickness of the resulting membranes was 8 mils in each case, ie 0.020 cms.

The results of test runs carried out at 16° C. and 200 psig, on skim milk with a pH 6.8, are given in Table II.

TABLE II

| Wt % Steel | Flux Rate usgfd | Wt % lactose in permeate |
| --- | --- | --- |
| 0 | 5.46 | 3.3 |
| 12 | 9.1 | 3.0 |
| 18 | 9.8 | 2.8 |

TABLE II-continued

| Wt % Steel | Flux Rate usgfd | Wt % lactose in permeate |
| --- | --- | --- |
| 24 | 10.5 | 2.2 |

EXAMPLE 3

In this Example a micronised silica (Gasil 200) of mean particle size 5 microns was incorporated in a series of membranes otherwise prepared as described in Example 1. The membranes were tested at various temperatures as previously described, and the results appear in Table III.

TABLE III

| % Silica | Operating Temp. °C. | Flux (usgfd) |
| --- | --- | --- |
| 0 | 16 | 5.46 |
| 0 | 50 | 5.95 |
| 6 | 16 | 9.1 |
| 6 | 50 | |
| 12 | 16 | 9.8 |
| 12 | 50 | 12.6 |
| 18 | 16 | 11.2 |
| 24 | 16 | 10.5 |

EXAMPLE 4

The effect of changing the solvent on the properties of the membranes according to the invention was examined in this Example. Membranes were prepared otherwise as described in Example 1, from dimethyl formamide and dimethyl sulphoxide, using as the particulate matter Supercarbovar carbon, of particle size 14 millimicrons and pH 5. The membrane thickness in each case was 8 mils, and the membranes were tested for the concentration of skim milk, against similarly prepared control membranes containing no inert particles, at room temperature (20° C.) and 200 psig, with the results reported in Table IV.

TABLE IV

| Solvent Fils thickness mils | Dimethyl formamide | | | | | | Dimethyl sulphoxide | | | | | |
| --- | --- | --- | --- | --- | --- | --- | --- | --- | --- | --- | --- | --- |
| | 8 | | | 15 | | | 8 | | | 15 | | |
| Wt % carbon | 0 | 2 | 5 | 0 | 2 | 4 | 0 | 2 | 4 | 0 | 2 | 4 |
| Flux usgfd | 5.5 | 9.1 | 10.5 | | | | 9.5 | 11.9 | 14.7 | 7.7 | — | 11.8 |

EXAMPLE 5

Cellulose acetate dopes were prepared containing 20 grammes of cellulose acetate powder, 100 mls of dimethyl formamide as solvent and powdered steel. A control dope of the same proportions of cellulose acetate and solvent was also prepared. The cellulose acetate was of grade E 3983, as supplied by Eastman Kodak Ltd, containing 39.8% acetyl groups and a viscosity No. 3. The dopes containing powdered steel were vigorously shaken to give a uniform mixture before being cast.

Casting was carried out in tubular modules mounted vertically, each consisting of a fibreglass porous support tube 4 ft long and ¾ inch in internal diameter, with walls about ⅛ inch thick. A plug of the dope was drawn through the tube in each case, at about 2 feet per minute from the bottom of the tube to the top at about 15° C. on a stainless steel, conical casting bob about 3 inches in length, by means of which the plug of dope was pushed up the tube to apply a uniform layer of the dope about 1 ml thick.

The tubes containing the bigger aggregates in the range examined were rotated by hand before admitting water into the tube, to centrifuge the particles toward the membrane-support tube interface.

Finally the tubes were emptied and mounted in a tube separation unit for testing, which was carried out as follows:

Pasteurised milk of zero fat content and 3–3.5 wt % protein was circulated through the unit at 50° C. and at measured pressures and circulation rates. The protein rejection of each membrane was determined by examining the filtrate, using a Pro-milk Analyser (Ross Electric Co), by a dye-binding detection method using an amido-black dye.

From an examination of the results, it appeared that a substantial increase in flux rate was provided by the membranes according to the invention, from as little as 8 wt % (grammes per cc of solvent) being sufficient to double the flux rate compared with the control membrane. Greater quantities provided a corresponding increase in flux rate, up to 50% which was the maximum concentration measured. On the other hand, the complete protein rejection of the membranes was sustained for all particle sizes, from 50–200 microns, except at greater concentrations than 25% with the smallest particles. Further particulars appear in Tables V and VI, obtained at an operating pressure of 60 psig, an operating temperature of 50° C. and a milk circulation throughput of 700 gals per hour. In regard to Table V, protein rejection failure was observed at other pressures and flow rates using more than 25% of the steel particles.

Further tests established that the flux remained substantially higher for all the membranes made in accordance pressures and flow rates using more than 25% of the steel particles.

Further tests established that the flux remained substantially higher for all the membranes made in accordance with the invention by comparison with the control membrane, whatever the extent to which the milk was concentrated, the flux falling progressively at similar rates with increase in the extent to which the milk was concentrated, both for the control and for the membranes according to the invention. A comparison with commercially-available tubular modules showed that these exhibited similar flux rates at the same operational pressure, as the control membrane prepared in the Example. Details of these further tests are given in Table VII.

TABLE V

| Concentration of steel of particle size 120-150 micron % | Flux Rate IG/ft$^2$ day | Rejection to protein % |
| --- | --- | --- |
| 0 | 15 | 100 |
| 8 | 30 | 100 |
| 10 | 40 | 100 |
| 15 | 45 | 100 |

TABLE V-continued

| Concentration of steel of particle size 120-150 micron % | Flux Rate IG/ft² day | Rejection to protein % |
|---|---|---|
| 20 | 50 | 100 |
| 25 | 42 | 100 |
| 30 | 200 | nil |
| 40 | 300 | nil |
| 50 | 450 | nil |

TABLE VI (100% protein rejection throughout)

| Particle size microns (20 g/100 ml solvent) | Flux IG/ft² day |
|---|---|
| 50 | 30 |
| 60-90 | 30 |
| 90-120 | 30 |
| 120-150 | 50 |
| 150-200 | 50 |

TABLE VII

| Circulation Rate Gals/hr. | Degree of Concn. (X-fold) | | | |
|---|---|---|---|---|
| | 1 | 2 | 3 | 4 |
| | 60 psig | | | |
| 700 | 42 | 23 | 16 | 11 |
| | 100 psig | | | |
| 700 | 60 (16) | 395 (10) | 25 (6) | 16 (4.5) |
| 1200 | 78 | 50 | 33 | — |

In Table VII the flux obtained from the control tubes, supporting membranes free from these steel particles, is given in brackets. It will be observed that the flux obtained using tubes according to the invention is substantially higher, even at the 60 psig operating pressure, than that obtained with the control at the higher operating pressure of 100 psig for the same circulation rate and at all degrees of concentration at which the measurements were made, the flux falling at substantially the same rate in all cases as the degree of concentration is increased.

EXAMPLE 6

In this Example a comparison is made of the effect of different solvents on the rejection/flux rates of membranes prepared in accordance with the invention. A similar method was used for preparing tube-supported membranes as described in Example 5, with 45% in each case of similar steel particles. One pair of tubes containing unfractionated aggregates and made from dope with dimethyl sulphoxide (DMSO) and dimethyl formamide (DMF) as solvent. Both gave a threefold improvement in flux rate over corresponding control tubes with no additive, in the concentration of skim milk, protein rejection remaining at 100%. The control made using DMSO had a substantially higher flux rate itself than that made using DMF.

When these comparative tests were repeated, using however the 60-90 micron sieve fraction of the steel aggregate, a complete loss of selectivity for milk protein was observed with the DMSO tube, which however showed 100% rejection of milk bacteria with no flaws, enabling the milk to be cold-sterilised by filtration through the membrane without change in composition.

In the case of the DMF membrane, protein rejection remained at 100%, but the flux rate increased further, to a similar rate to that obtained using the whole aggregate with DMSO.

In comparable tests in which in all respects the particulars of Example 1 were followed to obtain closely similar membranes with the exception that the dope solvent was acetone, the membrane was found to be wholly unacceptable when particles of any of the additive materials were present.

EXAMPLE 7

This Example illustrates an alternative method of preparing the membranes of the invention, in which instead of incorporating the particulate matter in the dope before the film is cast on the support surface, it is previously spread on the latter and the film is cast over it. The particles should not of course embed into the support layer, so that the dope is free to percolate and thus substantially wholly incorporate the particles.

A slurry of the particulate matter, comprising the aggregated stainless steel particles described in the preceding Examples in a 20% gms/cc. concentration in acetone, was painted on a glass plate and the solvent evaporated, leaving a deposit of the particles on the plate of about 20 mgms per cm².

A cellulose acetate film was formed on the plate as described in Example 1, over the coating of steel particles.

On testing the film as described in Example 1 a threefold improvement in flux rate was observed over a control membrane prepared under similar conditions but with no particles, in the concentration of skim milk at a circulation of 6 gallons per hour and a pressure of 50 psig, through a membrane 1½ inches in diameter.

A comparable improvement was obtained using similar particles to those described in Example 1. It was also found that the amount of the particles deposited could be varied at least between 5 and 500 mgms. per cm² and could be applied directly to porous support means for the film, on which the dope was cast in situ, either in plate or tubular form.

What is claimed is:

1. A method of preparing an ultra-filtration membrane of improved flux comprising the steps of:
   (a) applying to a support surface a slurry of a finely divided inert, impervious and water-isoluble solid particulate flux improver contained in a volatile solvent,
   (b) evaporating said solvent whereby a thin layer of the flux improver is left on said support surface,
   (c) applying a film of a casting dope consisting essentially of a solution of a film-forming organic polymer in a non-volatile solvent over the said layer of flux improver, and
   (d) promptly thereafter contacting the said film with water to leach out the said non-volatile solvent.

2. A method according to claim 1 in which the flux improver is applied to the said surface in the said slurry at a concentration of from 5-500 milligrammes per cm².

* * * * *

UNITED STATES PATENT AND TRADEMARK OFFICE
CERTIFICATE OF CORRECTION

PATENT NO. : 4,188,418

DATED : February 12, 1980

INVENTOR(S) : Robert M. Livingston

It is certified that error appears in the above-identified patent and that said Letters Patent are hereby corrected as shown below:

In the Specification cover page insert:

/30/ Foreign Application Priority Date

August 9, 1972 /GB/ United Kingdom . . . . . . . 37080/72

Signed and Sealed this

Thirty-first Day of March 1981

[SEAL]

Attest:

RENE D. TEGTMEYER

Attesting Officer     Acting Commissioner of Patents and Trademarks